US012786782B2

(12) United States Patent
Zhang et al.

(10) Patent No.: US 12,786,782 B2
(45) Date of Patent: Nov. 3, 2026

(54) METHODS AND APPARATUSES FOR SUPPORTING CONNECTIVITY OF MULTIPLE SECONDARY NODES (SNs) IN A MULTI-RADIO DUAL CONNECTIVITY (MR-DC) SCENARIO

(71) Applicant: Lenovo (Beijing) Limited, Beijing (CN)

(72) Inventors: Congchi Zhang, Shanghai (CN); Lianhai Wu, Beijing (CN); Mingzeng Dai, Shanghai (CN); Le Yan, Shanghai (CN)

(73) Assignee: Lenovo (Beijing) Limited, Beijing (CN)

( * ) Notice: Subject to any disclaimer, the term of this patent is extended or adjusted under 35 U.S.C. 154(b) by 354 days.

(21) Appl. No.: 18/684,761

(22) PCT Filed: Aug. 20, 2021

(86) PCT No.: PCT/CN2021/113780
§ 371 (c)(1),
(2) Date: Feb. 19, 2024

(87) PCT Pub. No.: WO2023/019550
PCT Pub. Date: Feb. 23, 2023

(65) Prior Publication Data
US 2024/0357416 A1 Oct. 24, 2024

(51) Int. Cl.
*H04W 28/02* (2009.01)
*H04W 76/12* (2018.01)
*H04W 76/20* (2018.01)

(52) U.S. Cl.
CPC ....... *H04W 28/0268* (2013.01); *H04W 76/12* (2018.02); *H04W 76/20* (2018.02)

(58) Field of Classification Search
CPC ..... H04W 76/12; H04W 76/20; H04W 76/15; H04W 12/02; H04W 36/00; H04W 40/36;
(Continued)

(56) References Cited

U.S. PATENT DOCUMENTS

2015/0358105 A1 12/2015 Jung et al.
2020/0053815 A1* 2/2020 Teyeb .................. H04W 76/11
(Continued)

FOREIGN PATENT DOCUMENTS

CN 110352625 A 10/2019
CN 111083742 A 4/2020
CN 112689974 A 4/2021

OTHER PUBLICATIONS

PCT/CN2021/113780 , "International Preliminary Report on Patentability", PCT Application No. PCT/CN2021/113780, Feb. 29, 2024, 4 pages.
(Continued)

*Primary Examiner* — Brian T Le
(74) *Attorney, Agent, or Firm* — FIG. 1 Patents

(57) ABSTRACT

Methods and apparatuses are provided for supporting connectivity of multiple secondary nodes (SNs) (103) in a multi-radio dual connectivity (MR-DC) scenario under a 3rd Generation Partnership Project (3GPP) 5G system or the like. A method can be performed by a network device, e.g., a master node (MN) in a MR-DC scenario and can include: determining whether to support a quality of service (QoS) flow terminated at one SN or whether to support a further QoS flow terminated at multiple SNs simultaneously (401A); in response to supporting the QoS flow, determining that the QoS flow is terminated at a SN and the QoS flow uses a radio resource of a secondary cell group (SCG) at a further SN (402A); and in response to supporting the further QoS flow, transmitting, to a core network (CN) node,
(Continued)

information regarding a current serving SN of the futher QoS flow (403A).

20 Claims, 6 Drawing Sheets

(58) Field of Classification Search
CPC .... H04W 52/02; H04W 28/0268; H04L 63/00
See application file for complete search history.

(56) References Cited

U.S. PATENT DOCUMENTS

2021/0120450 A1 4/2021 Peng et al.
2021/0250801 A1 * 8/2021 Van Der Velde ............................ H04W 28/0268
2022/0141904 A1 * 5/2022 Yilmaz ................. H04W 76/27 370/329
2022/0232413 A1 * 7/2022 Ma .................... H04W 28/0273

OTHER PUBLICATIONS

PCT/CN2021/113780 , "International Search Report and Written Opinion", PCT Application No. PCT/CN2021/113780, May 17, 2022, 7 pages.

* cited by examiner

METHODS AND APPARATUSES FOR SUPPORTING CONNECTIVITY OF MULTIPLE SECONDARY NODES (SNs) IN A MULTI-RADIO DUAL CONNECTIVITY (MR-DC) SCENARIO

TECHNICAL FIELD

Embodiments of the present application generally relate to wireless communication technology, especially to methods and apparatuses for supporting connectivity of multiple secondary nodes (SNs) in a multi-radio dual connectivity (MR-DC) scenario.

BACKGROUND

Next generation radio access network (NG-RAN) supports a MR-DC operation. In the MR-DC operation, a user equipment (UE) with multiple transceivers may be configured to utilize resources provided by two different nodes connected via non-ideal backhauls. Wherein one node may provide NR access and the other one node may provide either evolved-universal mobile telecommunication system (UMTS) terrestrial radio access (UTRA) (E-UTRA) or NR access. One node may act as a master node (MN) and the other node may act as a secondary node (SN). The MN and SN are connected via a network interface (for example, Xn interface as specified in 3GPP standard documents), and at least the MN is connected to the core network.

The 3rd Generation Partnership Project (3GPP) 5G system or network adopts a MRO mechanism. However, details regarding connectivity of multiple SNs in a MR-DC scenario have not been discussed in 3GPP 5G technology yet.

SUMMARY

Some embodiments of the present application provide a method performed by a network device, e.g., a MN in a MR-DC scenario. The method includes: determining whether to support a quality of service (QoS) flow terminated at one SN or whether to support a further QoS flow terminated at multiple SNs simultaneously; in response to supporting the QoS flow, determining that the QoS flow is terminated at a SN and the QoS flow uses a radio resource of a secondary cell group (SCG) at a further SN; and in response to supporting the further QoS flow, transmitting, to a core network (CN) node, information regarding a current serving SN of the further Qos flow.

Some embodiments of the present application also provide a network device, e.g., a MN in a MR-DC scenario. The network device includes a processor and a wireless transceiver coupled to the processor; and the processor is configured: to determine whether to support a QoS flow terminated at one SN or whether to support a further QoS flow terminated at multiple SNs simultaneously; to determine that the QoS flow is terminated at a SN and the QoS flow uses a radio resource of a SCG at a further SN, in response to supporting the QoS flow; and to transmit, to a CN node, information regarding a current serving SN of the further QoS flow, in response to supporting the further QoS flow.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a MN in a MR-DC scenario.

Some embodiments of the present application provide a method performed by a network device, e.g., a SN in a MR-DC scenario. The method includes: determining whether to support a QoS flow terminated at one SN; in response to supporting the QoS flow, transmitting data forwarding address information of the SN and configuration information of the SN; and in response to supporting the QoS flow, receiving data forwarding address information of a further SN and configuration information related to a radio resource of a SCG at the further SN.

Some embodiments of the present application also provide a network device, e.g., a SN in a MR-DC scenario. The SN includes a processor and a wireless transceiver coupled to the processor; and the processor is configured: to determine whether to support a QoS flow terminated at one SN; to transmit, via the wireless transceiver, data forwarding address information of the SN and configuration information of the SN, in response to supporting the QoS flow; and to receive, via the wireless transceiver, data forwarding address information of a further SN and configuration information related to a radio resource of a SCG at the further SN, in response to supporting the QoS flow.

Some embodiments of the present application provide a method performed by a network device, e.g., a SN in a MR-DC scenario. The method includes: receiving, from a MN, configuration information for supporting a QoS flow; determining whether the SN is a current serving SN of the QoS flow; and in response to the SN being the current serving SN, determining whether to switch a UE from the SN to a further SN, wherein the further SN is a next serving SN after switching the UE.

Some embodiments of the present application also provide a network device, e.g., a SN in a MR-DC scenario. The SN includes a processor and a wireless transceiver coupled to the processor; and the processor is configured: to receive, via the wireless transceiver from a MN, configuration information for supporting a QoS flow; to determine whether the SN is a current serving SN of the QoS flow; and to determine whether to switch a UE from the SN to a further SN in response to the SN being the current serving SN, wherein the further SN is a next serving SN after switching the UE.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned methods performed by a SN in a MR-DC scenario.

The details of one or more examples are set forth in the accompanying drawings and the descriptions below. Other features, objects, and advantages will be apparent from the descriptions and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1A:
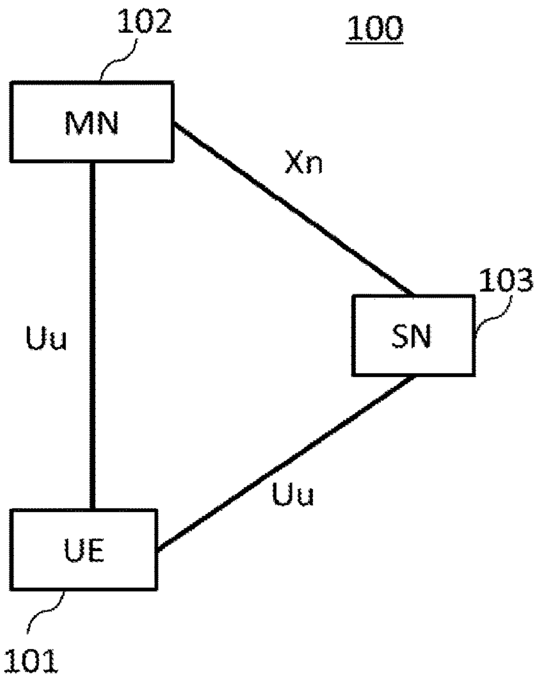
FIG. 1A illustrates a schematic diagram of a wireless communication system in accordance with some embodiments of the present application.

FIG. 1A illustrates a schematic diagram of a wireless communication system in accordance with some embodiments of the present application.

As shown in FIG. 1A, the wireless communication system 100 may be a dual connectivity system 100, including at least one UE 101, at least one MN 102, and at least one SN 103. In particular, the dual connectivity system 100 in FIG. 1A includes one shown UE 101, one shown MN 102, and one shown SN 103 for illustrative purpose. Although a specific number of UEs 101, MNs 102, and SNs 103 are depicted in FIG. 1A, it is contemplated that any number of UEs 101, MNs 102, and SNs 103 may be included in the wireless communication system 100.

Referring to FIG. 1A, UE 101 may be connected to MN 102 and SN 103 via a network interface, for example, the Uu interface as specified in 3GPP standard documents. MN 102 and SN 103 may be connected with each other via a network interface, for example, the Xn interface as specified in 3GPP standard documents. MN 102 may be connected to the core network via a network interface (not shown in FIG. 1A). UE 102 may be configured to utilize resources provided by MN 102 and SN 103 to perform data transmission.

MN 102 may refer to a radio access node that provides a control plane connection to the core network. In an embodiment of the present application, in the E-UTRA-NR Dual Connectivity (EN-DC) scenario, MN 102 may be an eNB. In another embodiment of the present application, in the next generation E-UTRA-NR Dual Connectivity (NGEN-DC) scenario, MN 102 may be an ng-eNB. In yet another embodiment of the present application, in the NR-E-UTRA Dual Connectivity (NE-DC) scenario or the NR-NR Dual Connectivity (NR-DC) scenario, MN 102 may be a gNB. MN 102 may be associated with a MCG. The MCG may refer to a group of serving cells associated with MN 102, and may include a primary cell (PCell) and optionally one or more secondary cells (SCells) of the MCG. The PCell may provide a control plane connection to UE 101.

SN 103 may refer to a radio access node without a control plane connection to the core network but providing additional resources to UE 101. In an embodiment of the present application, in the EN-DC scenario, SN 103 may be an en-gNB. In another embodiment of the present application, in the NE-DC scenario, SN 103 may be a ng-eNB. In yet another embodiment of the present application, in the NR-DC scenario or the NGEN-DC scenario, SN 103 may be a gNB. SN 103 may be associated with a SCG. The SCG may refer to a group of serving cells associated with SN 103, and may include a primary secondary cell (PSCell) and optionally one or more secondary cells (SCells). The PCell of the MCG and the PSCell of the SCG may also be referred to as a special cell (SpCell).

In some embodiments of the present application, UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. In some other embodiments of the present application, UE 101 may include a portable wireless communication device, a smart phone, a cellular telephone, a flip phone, a device having a subscriber identity module, a personal computer, a selective call receiving circuitry, or any other device that is capable of sending and receiving communication signals on a wireless network. In some other embodiments of the present application, UE 101 may include wearable devices, such as smart watches, fitness bands, optical head-mounted displays, or the like. Moreover, UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

Figure 1B:
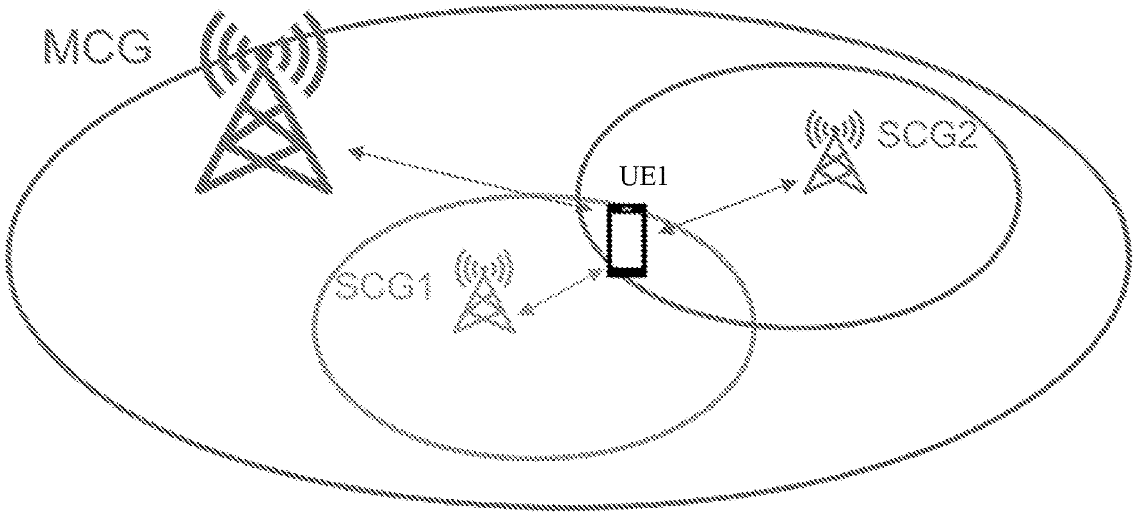
FIG. 1B illustrates a schematic diagram of a UE configured with more than one secondary cell group (SCG) associated with different SNs in accordance with some embodiments of the present application.

FIG. 1B illustrates a schematic diagram of a UE configured with more than one secondary cell group (SCG) associated with different SNs in accordance with some embodiments of the present application.

As shown in FIG. 1B, UE1 is configured with two SCGs, i.e., SCG1 and SCG2. UE1 may communicate with MCG and these two SCGs. In some embodiments, in a PSCell switch procedure, UE1 may switch from a PSCell in SCG1 to a PSCell in SCG2, or switch from a PSCell in SCG2 to a PSCell in SCG1.

In a MR-DC scenario, a UE is configured with a MCG connection to a MN and a SCG connection to a SN. In discussions of 3GPP release 18, it is considered beneficial to serve a UE with more than one SN due to: more flexible bearer type configuration possible (with a packet data convergence protocol (PDCP) at one SN and a radio link control (RLC) at another SN); and a dynamic switch procedure between SNs can help to reduce the SN change latency in the legacy technology. On the other hand, to support new bearer types, especially for those cross different SNs, procedures need to be defined for making a decision and parameters exchange cross relevant nodes. Besides, to ensure a dynamic switch procedure between SNs, multiple SNs shall be prepared to support the same QoS flows, and there is no MCG configuration impact during the SN switch procedure. Therefore, there is a need to keep a CN node (e.g., an access and mobility management function (AMF) or a user plane function (UPF)) be aware of which SN is the current serving SN while other SN(s) are non-serving SN(s) prepared for a fast inter-SN SCG switch procedure.

Currently, an issue of how to better support connectivity of multiple SNs has not been solved. Embodiments of the present application provide solutions in which it is upon a MN's decision to support a SN terminated QoS flow using SCG bearer from another SN; data transfer related information is shared between SNs via a MN; multiple SNs can be configured to support the same QoS flow(s), and a CN node is informed about the current serving SN for downlink (DL) data transfer; a MN or a serving SN can initiate the fast SN switch procedure and inform the CN node about the SN switch occurrence. More details will be illustrated in following text in combination with the appended drawings.

Figure 2A:
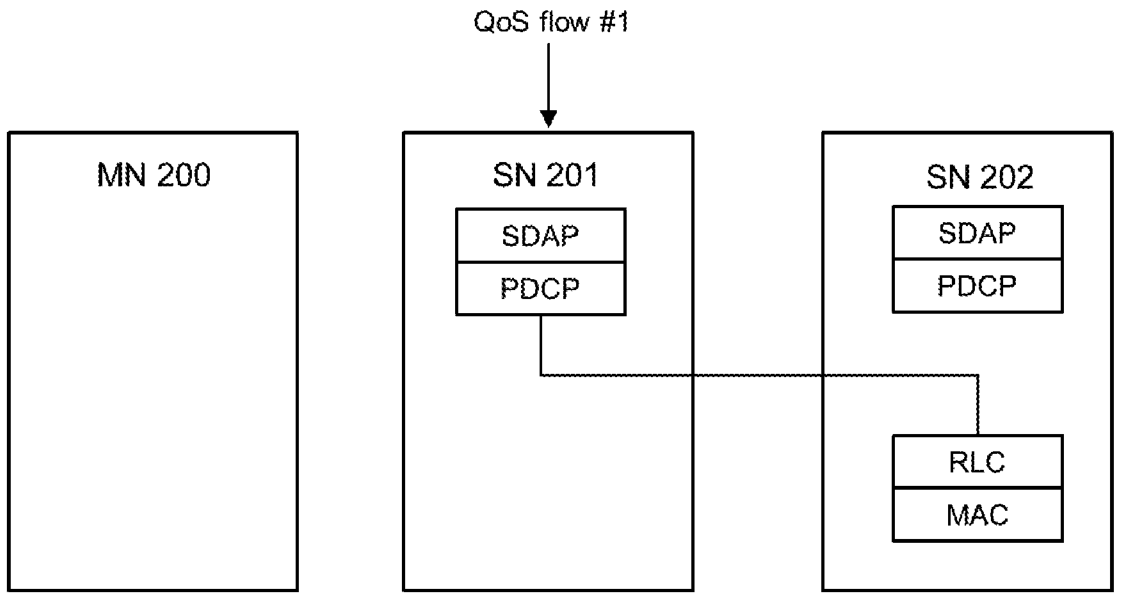
FIG. 2A illustrates a schematic diagram of a SCG bearer of a SN terminated at a different SN in accordance with some embodiments of the present application.

FIG. 2A illustrates a schematic diagram of a SCG bearer of a SN terminated at a different SN in accordance with some embodiments of the present application. In the embodiments of FIG. 2A, MN 200 wants to offload QoS flow #1 to one SN 201, it is upon the SN 201's decision whether to support QoS flow #1 by configuring "SN 201 terminated SCG bearer at SN 201" or "SN 201 terminated SCG bearer at SN 202" or "SN 201 terminated split bearer". Assuming that SN 201 decides to support QoS flow #1 using "SN 201 terminated SCG bearer at SN 202", the PDCP entity is located in SN 201 and the RLC leg is at SN 202. A specific example is described in embodiments of FIG. 7 as below.

Figure 2B:
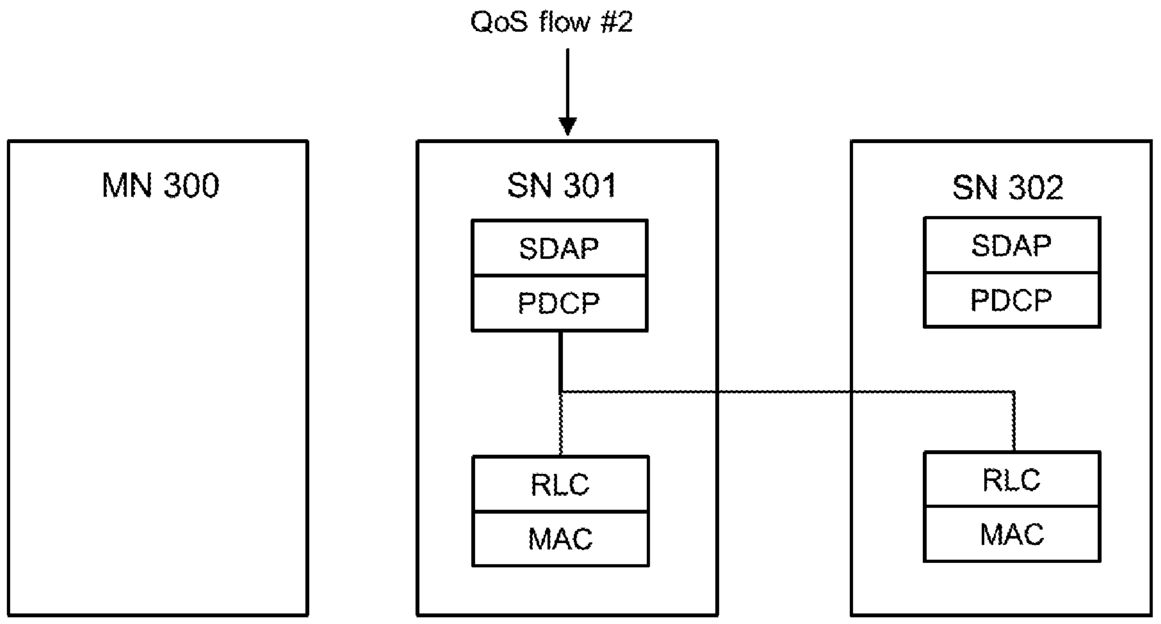
FIG. 2B illustrates a schematic diagram of a SN terminated split bearer in accordance with some embodiments of the present application.

FIG. 2B illustrates a schematic diagram of a SN terminated split bearer in accordance with some embodiments of the present application. In the embodiments of FIG. 2B, MN 300 wants to offload QoS flow #2 to one SN 301, it is upon the SN 301's decision whether to support QoS flow #2 by configuring "SN 301 terminated SCG bearer at SN 301" or "SN 301 terminated SCG bearer at SN 302" or "SN 301 terminated split bearer". Assuming that SN 201 decides to support QoS flow #2 using "SN 301 terminated split bearer", the PDCP entity is located in SN 301 and it has two RLC legs at SN 301 and SN 302 (i.e., one SN 301 leg, and one SN 302 leg). A specific example is described in embodiments of FIG. 7 as below.

Figure 3:
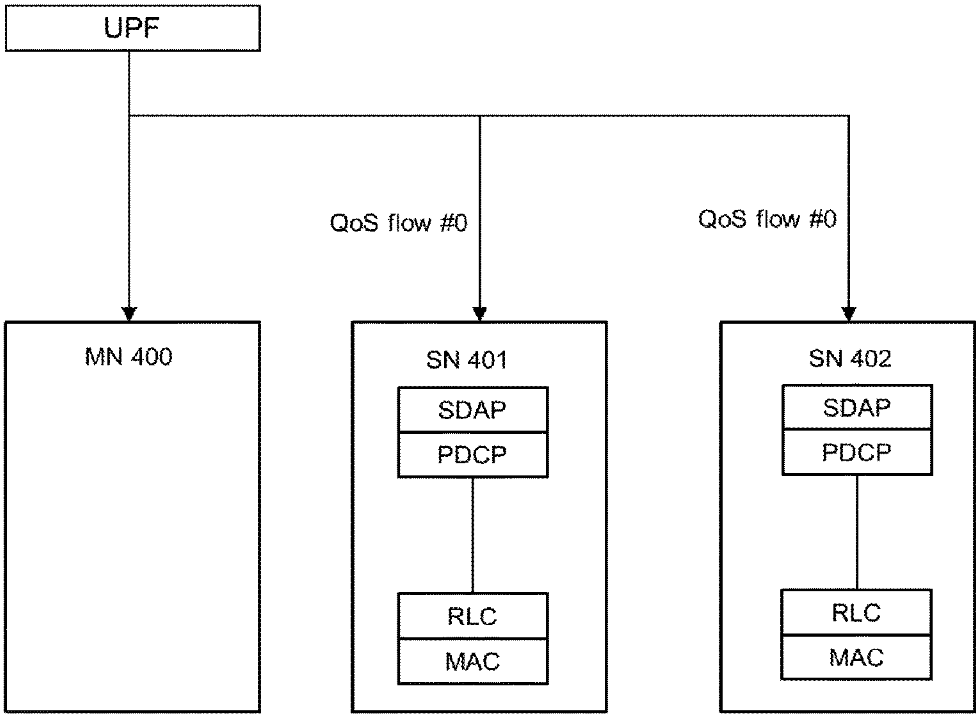
FIG. 3 illustrates an exemplary diagram of multiple SNs prepared to support the same QoS flow(s) in accordance with some embodiments of the present application.

FIG. 3 illustrates an exemplary diagram of multiple SNs prepared to support the same QoS flow(s) in accordance with some embodiments of the present application. In the embodiments of FIG. 3, the same QoS flow #0 from a UPF is anchored at different SNs (i.e., SN 401 and SN 402), and either MN 400 or the current serving SN 401 can decide to switch a UE from one SN to another SN. It is assumed that the UE is provided with SCG configurations from different SNs (i.e., SN 401 and SN 402) in advance of a SN switch procedure, and the SN switch procedure between SN 401 and SN 402 will not impact the MCG configuration at MN 400. Specific examples are described in embodiments of FIGS. 8 and 9 as below.

Figure 4:
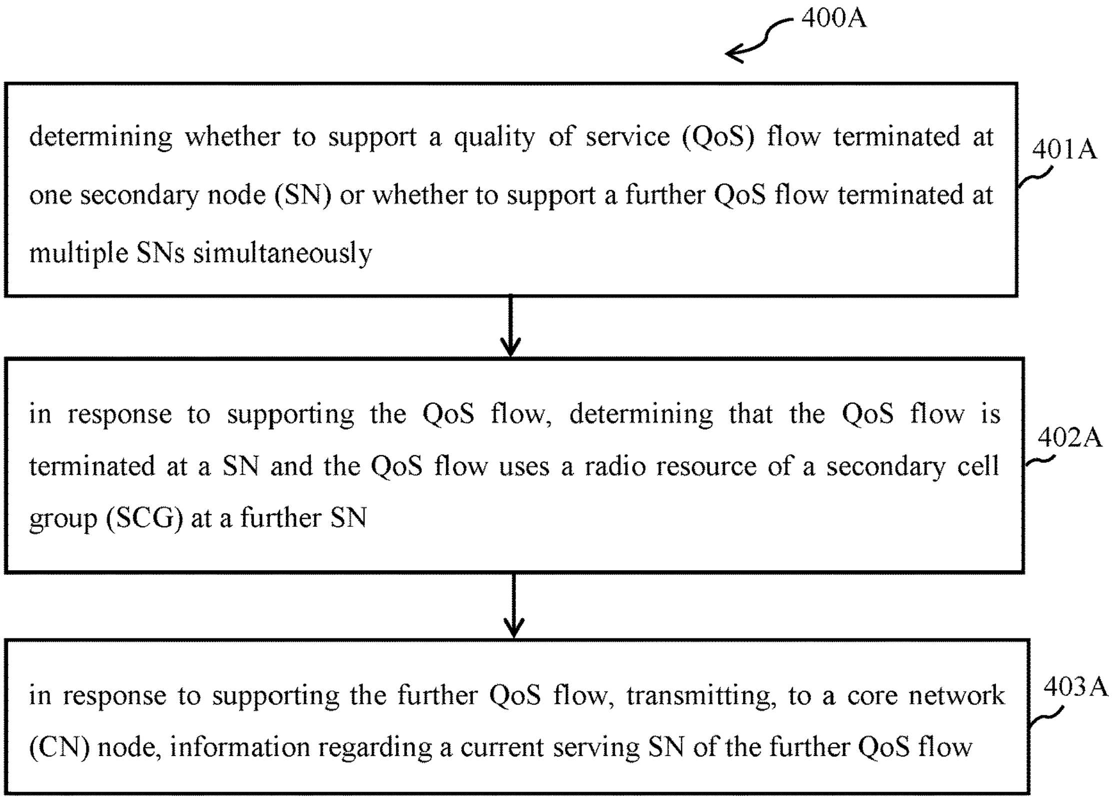
FIG. 4 illustrates an exemplary flowchart of transmitting information regarding a current serving SN of a QoS flow in accordance with some embodiments of the present application.

FIG. 4 illustrates an exemplary flowchart of transmitting information regarding a current serving SN of a QoS flow in accordance with some embodiments of the present application. The exemplary method 400A in the embodiments of FIG. 4 may be performed by a network device, e.g., a MN (e.g., MN 102, MN 200, MN 300, MN 400, MN 720, MN 830, or MN 930 as shown and illustrated in any of FIGS. 1A, 2A, 2B, 3, and 7-9). Although described with respect to a network device (e.g., a MN), it should be understood that other devices may be configured to perform a method similar to that of FIG. 4. The embodiments of FIG. 4 assume that the network device (e.g., a MN) is in a MR-DC scenario.

In the exemplary method 400A as shown in FIG. 4, in operation 401A, a network device determines whether to support a QoS flow terminated at one SN or whether to support a further QoS flow terminated at multiple SNs simultaneously. In an embodiment, the network device is a MN (e.g., MN 102 as shown and illustrated in FIG. 1A) in a MR-DC scenario.

In operation 402A, if the network device supports the QoS flow terminated at one SN, the network device determines that the QoS flow is terminated at a SN and the QoS flow uses a radio resource of a SCG at a further SN. In following text, the SN is named as "the 1st SN", and the further SN is named as "the 2nd SN".

In operation 403A, if the network device supports the further QoS flow terminated at multiple SNs simultaneously, the network device transmits, to a CN node, information regarding a current serving SN of the further QoS flow. The CN node may be an AMF or a UPF. In following text, the QoS flow is named as "the 1st QoS flow", and the further QoS flow is named as "the 2nd QoS flow".

In some embodiments, the information regarding the current serving SN of the 2nd QoS flow is included in a packet data unit (PDU) session resource modify indication message. Specific examples are described in embodiments of FIGS. 8 and 9 as below. In some embodiments, the information regarding the current serving SN of the 2nd QoS flow includes at least one of:

(1) DL address information of a SN within the multiple SNs. In an embodiment, the DL address information of the SN within the multiple SNs is DL TNL information of the SN within the multiple SNs.

(2) Information regarding a QoS flow associated with the SN within the multiple SNs.

(3) An indication for indicating whether the SN within the multiple SNs is the current serving SN.

In some embodiments, the information regarding the current serving SN of the 2nd QoS flow includes at least one of: (1) DL address information of the current serving SN; and (2) information regarding a QoS flow associated with the current serving SN. In an embodiment, the DL address of the current serving SN is DL TNL information of the current serving SN.

In some embodiments, the network device receives, from the 1st SN, configuration information regarding the 1st QoS flow. In response to receiving the configuration information, the network device determines that the 1st QoS flow is supported by the network device. For example, the configuration information is included in an Xn message. Specific examples are described in embodiments of FIG. 7 as below.

According to some embodiments, in response to supporting the 1st QoS flow, the network device transmits a request to the 2nd SN. For example, the request is a SN addition request message or a SN modification request message. The request may include at least one of:

(1) Information related to the 1st QoS flow. For instance, the information related to the 1st QoS flow may include at least one of:
  a) an identifier (ID) of the 1st QoS flow;
  b) a reliability parameter of the 1st QoS flow;
  c) a latency parameter of the 1st QoS flow; and
  d) a data rate of the 1st QoS flow.

(2) A PDCP parameter related to the 1st QoS flow. For instance, the PDCP parameter includes a PDCP sequence number (SN) length related to the 1st QoS flow.

(3) A RLC parameter related to the 1st QoS flow. For instance, the RLC parameter includes at least one of: a RLC sequence number (SN) related to the 1st QoS flow; and a RLC mode related to the 1st QoS flow.

(4) Uplink (UL) user plane (UP) transport network layer (TNL) information of the 1st SN. For instance, the UL UP TNL information includes at least one of:
  a) a cell group ID of the 1st SN;
  b) a transport layer address of the 1st SN; and
  c) a general packet radio service (GPRS) tunnelling protocol tunnel endpoint identifier (GTP-TEID) of the 1st SN.

In some embodiments, in response to supporting the 1st QoS flow, the network device receives a response from the 2nd SN. For instance, the response is an SN addition request acknowledge message or a SN modification request acknowledge message. The response may include at least one of:

(1) radio resource control (RRC) configuration information generated by the 2nd SN; and (2) DL user plane (UP) TNL information of the 2nd SN. For instance, the DL UP TNL information includes at least one of:
  a) a cell group ID of the 2nd SN;
  b) a transport layer address of the 2nd SN; and
  c) a GTP-TEID of the 2nd SN.

In some embodiments, in response to supporting the 1st QoS flow, the network device transmits, to the 1st SN, a message including the DL UP TNL information of the 2nd SN. For instance, the message is a SN modification request message or a SN modification confirm message.

According to some embodiments, in response to supporting the 1st QoS flow, the network device transmits a further message to a user equipment (UE). For instance, the further message is a RRC message. The further message may include at least one of:

(1) service data adaptation protocol (SDAP) configuration information from the 1st SN;

(2) PDCP configuration information from the 1st SN;

(3) RLC configuration information from the 2nd SN; and (4) medium access control (MAC) configuration information from the 2nd SN.

In some embodiments, in response to supporting the 2nd QoS flow, the network device decides to switch a UE from the current serving SN to another SN within the multiple SNs. In following text, the abovementioned another SN is named as "the 3rd SN". The 3rd SN is a next serving SN after switching the UE. In an embodiment, in response to deciding to switch the UE from the current serving SN to the 3rd SN, the network device transmits information regarding the 3rd SN to the CN node. The CN node may be an AMF or UPF. For example, the information regarding the 3rd SN may be included in a PDU session resource modify indication message. The information regarding the 3rd SN may include DL TNL information of the 3rd SN.

In a further embodiment, in response to deciding to switch the UE from the current serving SN to the 3rd SN, the network device transmits indicating information to the CN node. For example, the CN node is a UPF. The indicating information may be transmitted in a general packet radio service tunnel protocol—user plane (GTP-U) header. The indicating information may include at least one of:

(1) an indicator indicating whether the current serving SN will stop functioning as a serving SN;

(2) an indicator indicating whether a SN within the multiple SNs will start to function as a serving SN; and (3) an indicator indicating an address information of a next serving SN. For example, the address information is a tunnel endpoint ID of the next serving SN.

In some embodiments, in response to supporting the 2nd QoS flow, the network device transmits, to the current serving SN, information regarding one or more non-serving SNs within the multiple SNs. The information regarding the one or more non-serving SNs may be included in a SN modification request message. In an embodiment, the network device receives, from the current serving SN, a decision to switch a UE from the current serving SN to another SN within the multiple SNs; and the network device transmits the decision to the CN node. The CN node may be an AMF. The abovementioned another SN is a next serving SN after switching the UE. For example, the decision includes information regarding the abovementioned another SN.

Details described in all other embodiments of the present application (for example, details of supporting connectivity of multiple SNs in in a MR-DC scenario) are applicable for the embodiments of FIG. 4. Moreover, details described in the embodiments of FIG. 4 are applicable for all the embodiments of FIGS. 1A-3 and 5-10.

Figure 5:
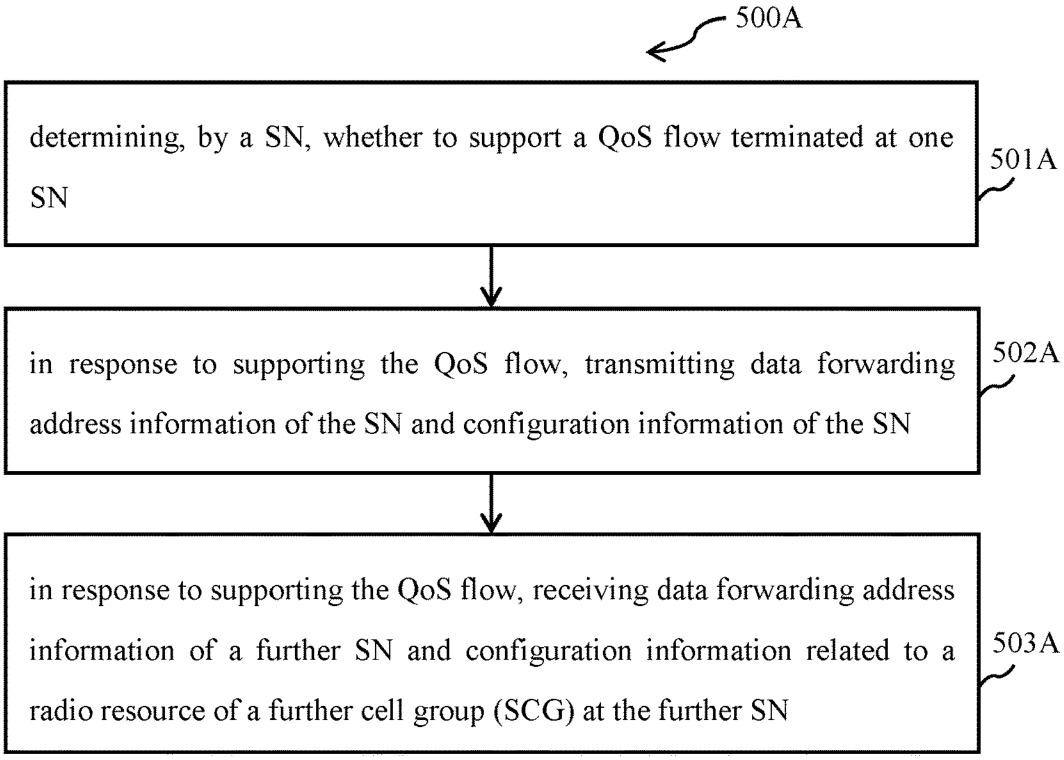
FIG. 5 illustrates an exemplary flowchart of transmitting data forwarding address information of a SN in accordance with some embodiments of the present application.

FIG. 5 illustrates an exemplary flowchart of transmitting data forwarding address information of a SN in accordance with some embodiments of the present application. Specific examples are described in embodiments of FIG. 7 as below.

The exemplary method 500A in the embodiments of FIG. 5 may be performed by a network device, e.g., a SN (e.g., SN 103, SN 201, SN 202, SN 301, SN 302, SN 401, SN 402, SN 730, SN 740, SN 840, SN 850, SN 940, or SN 950 as shown and illustrated in any of FIGS. 1A, 2A, 2B, 3, and 7-9). Although described with respect to a network device (e.g., a SN), it should be understood that other devices may be configured to perform a method similar to that of FIG. 5. The embodiments of FIG. 5 assume that the network device (e.g., a SN) is in a MR-DC scenario.

In the exemplary method 500A as shown in FIG. 5, in operation 501A, a SN (e.g., SN 103 as shown and illustrated in FIG. 1A) in a MR-DC scenario determines whether to support a QoS flow terminated at one SN. In operation 502A, in response to supporting the QoS flow, the SN transmits data forwarding address information of the SN and configuration information of the SN. In operation 503A, in response to supporting the QoS flow, the SN receives data forwarding address information of a further SN and configuration information related to a radio resource of a SCG at the further SN. In following text, the SN is named as "the 1st SN", and the further SN is named as "the 2nd SN".

Figure 7:
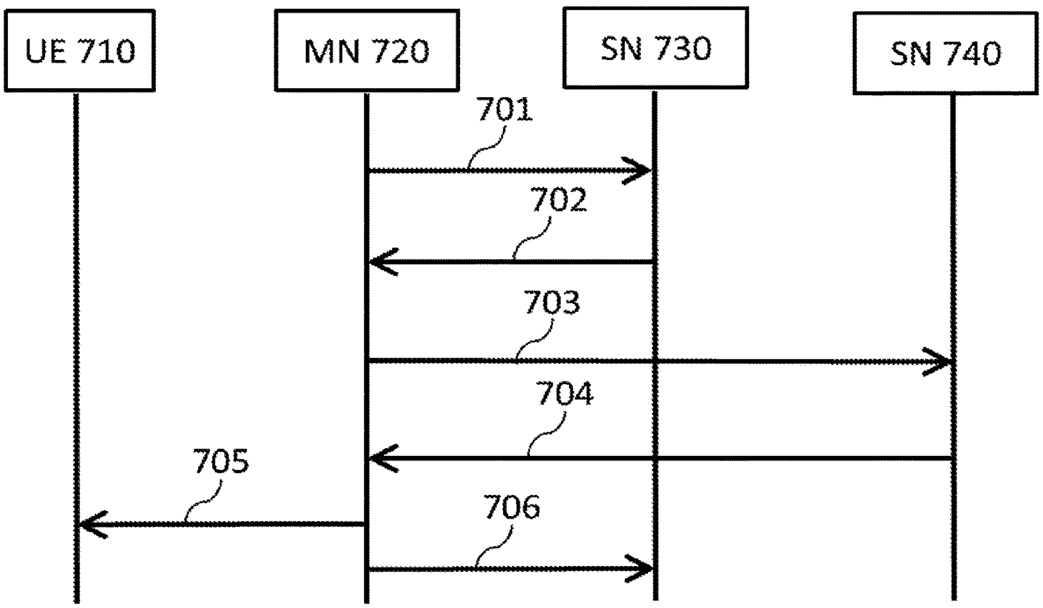
FIG. 7 illustrates an exemplary flowchart of configuring a SCG bearer of a SN terminated at a different SN in accordance with some embodiments of the present application.

According to some embodiments, if the QoS flow is terminated at the 1st SN (e.g., SN 730 as shown in FIG. 7), the 1st SN transmits configuration information regarding the QoS flow to a MN (e.g., MN 720 as shown and illustrated in FIG. 7). For example, the configuration information is included in an Xn message.

According to some further embodiments, if the QoS flow is terminated at the 1st SN (e.g., SN 730 as shown in FIG. 7), the 1st SN receives, from a MN (e.g., MN 720 as shown in FIG. 7), a message including DL UP TNL information of the 2nd SN (e.g., SN 740 as shown and illustrated in FIG. 7). The message may be a SN modification request message or a SN modification confirm message.

According to some other embodiments, if the QoS flow terminated at the 2nd SN (e.g., SN 730 as shown in FIG. 7), the 1st SN (e.g., SN 740 as shown in FIG. 7) transmits configuration information regarding the QoS flow to a MN (e.g., MN 720 as shown in FIG. 7). This configuration information may be included in an Xn message.

In some embodiments, if the QoS flow terminated at the 2nd SN (e.g., SN 730 as shown in FIG. 7), the 1st SN (e.g., SN 740 as shown in FIG. 7) receives a request from a MN (e.g., MN 720 as shown in FIG. 7). The request may be a SN addition request message or a SN modification request message. For example, the request includes at least one of:

(1) Information related to the QoS flow. The information related to the QoS flow includes at least one of:
   a) an ID of the QoS flow;
   b) a reliability parameter of the QoS flow;
   c) a latency parameter of the QoS flow; and
   d) a data rate of the QoS flow.

(2) A PDCP parameter related to the QoS flow. The PDCP parameter includes a PDCP sequence number (SN) length related to the QoS flow.

(3) A RLC parameter related to the QoS flow. The RLC parameter includes at least one of: a RLC sequence number (SN) related to the QoS flow; and a RLC mode related to the QoS flow.

(4) UL UP TNL information of the 2nd SN (e.g., SN 730 as shown in FIG. 7). The UL UP TNL information includes at least one of:
   a) a cell group ID of the 1st SN;
   b) a transport layer address of the 1st SN; and
   c) a GTP-TEID of the 2nd SN.

According to some embodiments, if the QoS flow terminated at the 2nd SN (e.g., SN 730 as shown in FIG. 7), the 1st SN (e.g., SN 740 as shown in FIG. 7) transmits a response to a MN (e.g., MN 720 as shown in FIG. 7). The response may be an SN addition request acknowledge message or a SN modification request acknowledge message. The response includes at least one of:

(1) RRC configuration information generated by the 2nd SN; and (2) DL UP TNL information of the 1st SN. The DL UP TNL information includes at least one of:
   a) a cell group ID of the 1st SN (e.g., SN 740 as shown in FIG. 7);
   b) a transport layer address of the 1st SN; and
   c) a GTP-TEID of the 1st SN.

Details described in all other embodiments of the present application (for example, details of supporting connectivity of multiple SNs in in a MR-DC scenario) are applicable for the embodiments of FIG. 5. Moreover, details described in the embodiments of FIG. 5 are applicable for all the embodiments of FIGS. 1A-4 and 6-10.

Figure 6:
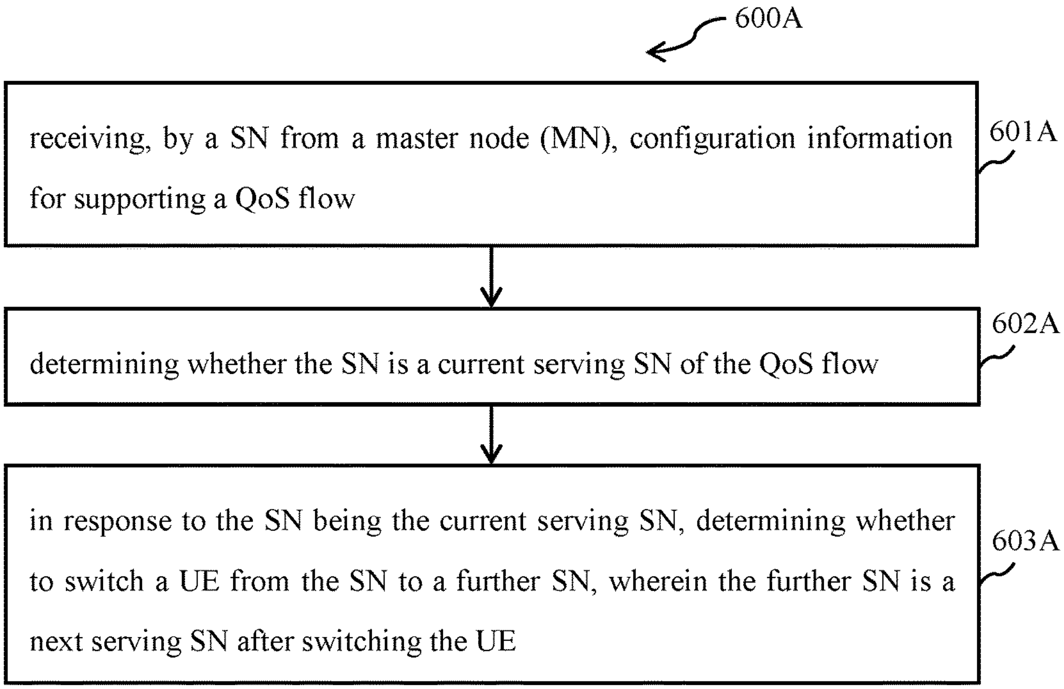
FIG. 6 illustrates a further exemplary flow chart of receiving configuration information for supporting a QoS flow in accordance with some embodiments of the present application.

FIG. 6 illustrates a further exemplary flow chart of receiving configuration information for supporting a QoS flow in accordance with some embodiments of the present application. Specific examples are described in embodiments of FIGS. 8 and 9 as below.

The exemplary method 600A in the embodiments of FIG. 6 may be performed by a network device, e.g., a SN (e.g., SN 103, SN 201, SN 202, SN 301, SN 302, SN 401, SN 402, SN 730, SN 740, SN 840, SN 850, SN 940, or SN 950 as shown and illustrated in any of FIGS. 1A, 2A, 2B, 3, and 7-9). Although described with respect to a network device (e.g., a SN), it should be understood that other devices may be configured to perform a method similar to that of FIG. 6. The embodiments of FIG. 6 assume that the network device (e.g., a SN) is in a MR-DC scenario.

Figure 8:
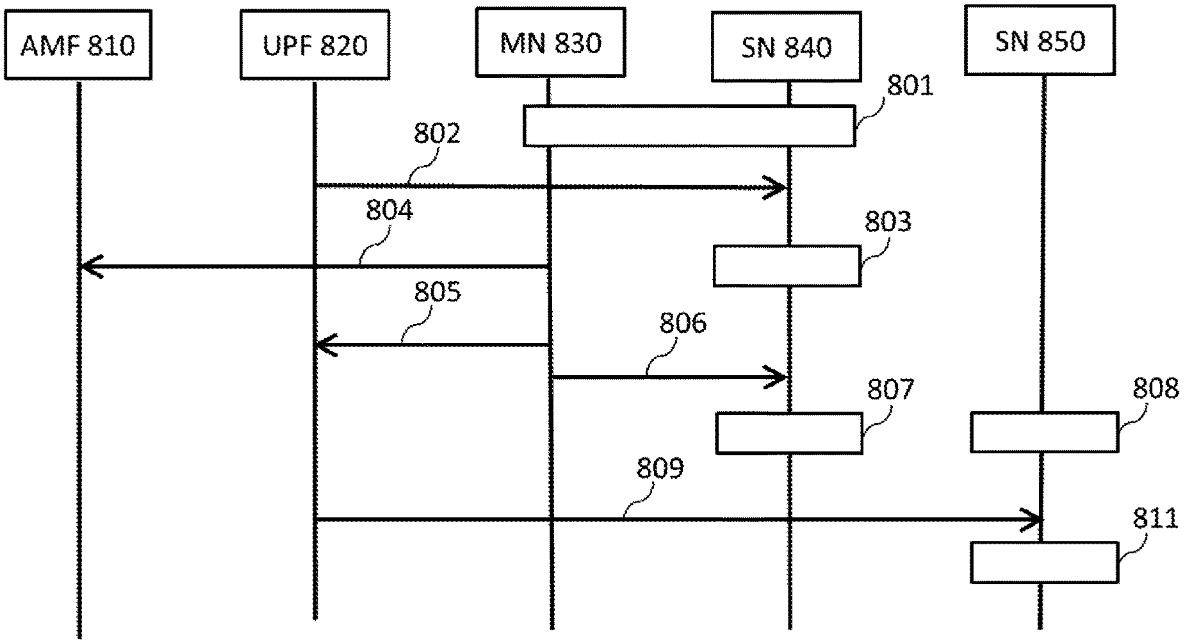
FIG. 8 illustrates an exemplary flowchart of supporting a fast SN switch procedure triggered by a MN in accordance with some embodiments of the present application.

In the exemplary method 600A as shown in FIG. 6, in operation 601A, a SN (e.g., SN 840 as shown in FIG. 8) in a MR-DC scenario receives, from a MN (e.g., MN 830 as shown and illustrated in FIG. 8), configuration information for supporting a QoS flow. In operation 602A, the SN determines whether the SN is a current serving SN of the QoS flow. In operation 603A, if the SN is the current serving SN, the SN determines whether to switch a UE from the SN to a further SN. The further SN is a next serving SN after switching the UE. In following text, the SN is named as "the 1st SN", and the further SN is named as "the 2nd SN".

According to some embodiments, if the 1st SN determines to switch the UE from the current serving SN to the 2nd SN, the 1st SN releases context information about one or more non-serving SNs.

According to some further embodiments, if the 1st SN determines to switch the UE from the current serving SN to the 2nd SN, the 1st SN transmits, to the MN, a decision to switch the UE from the current serving SN to the 2nd SN. The decision may include information regarding the 2nd SN.

According to some other embodiments, if the 1st SN determines to switch the UE from the current serving SN to the 2nd SN, the 1st SN transmits indicating information to a CN node. For example, the CN node is a UPF. The indicating information may be transmitted in a GTP-U header as defined in 3GPP standard document TS29.281. In some embodiments, the indicating information includes at least one of:

(1) an indicator which indicates whether the current serving SN will stop functioning as a serving SN;

(2) an indicator which indicates whether a SN within the multiple SNs will start to function as a serving SN; and (3) an indicator which indicates an address information of a next serving SN. The address information may be a tunnel endpoint ID of the next serving SN.

Details described in all other embodiments of the present application (for example, details of supporting connectivity of multiple SNs in in a MR-DC scenario) are applicable for the embodiments of FIG. 6. Moreover, details described in the embodiments of FIG. 6 are applicable for all the embodiments of FIGS. 1A-5 and 7-10.

FIG. 7 illustrates an exemplary flowchart of configuring a SCG bearer of a SN terminated at a different SN in accordance with some embodiments of the present application.

The embodiments of FIG. 7 assume that MN 720 wants to offload a QoS flow to one SN 730, it is upon the SN 730's decision whether to support the QoS flow by configuring "SN 730 terminated SCG bearer at SN 740" or "SN 730 terminated MCG bearer at MN 720". In step 701 as shown in FIG. 7, MN 720 transmits, to SN 730, a SN addition request message or a SN modification request message as well as Qos flow offloading related information.

Assuming that SN 730 decides to support the QoS flow using "SN 730 terminated MCG bearer at MN 720", in step 702 as shown in FIG. 7, SN 730 transmits, to MN 720, a Xn SN addition request acknowledge message or a Xn SN modification request acknowledge message including: SDAP configurations or PDCP configurations in a RRC container, the concerned QoS flow of SN 730, PDCP parameters of SN 730, RLC parameters of SN 730, and/or UL UP TNL information of SN 730.

Upon receiving the Xn message from SN 730 for configuring "SN 730 terminated MCG bearer" or "SN 730 terminated split bearer with MCG leg", MN 720 may decide to support the SN 730 terminated QoS flow using cell group resource(s) from SN 740. In step 703 as shown in FIG. 7, MN 720 transmits, to SN 740, a Xn SN addition request message or a Xn SN modification request message including: the concerned QoS flow of SN 730, PDCP parameters of SN 730, RLC parameters of SN 730, and/or UL UP TNL information of SN 730. For instance, any or a combination of following information may be included in the Xn SN addition request or the Xn SN modification request message:

(1) QoS flow related information which is anchored at SN 730, e.g., a QoS flow ID, QoS parameter(s) (e.g., reliability, latency, and/or data rate).

(2) PDCP parameter(s), e.g., a PDCP sequence number (SN) length.

(3) Radio link control (RLC) parameter(s) suggested/shall be used, e.g., a RLC sequence number (SN), and/or a RLC mode.

(4) SN 730 UL UP TNL information, e.g., a transport layer address, and/or a GTP-TEID.

In step 704 as shown in FIG. 7, if SN 740 accepts the request from MN 720, SN 740 sends any (or a combination) of following information to MN 720 using a Xn SN addition request acknowledge message or a Xn SN modification request acknowledge message:

(1) RRC configuration generated by SN 740 for RLC layer or MAC layer.

(2) SN 740 DL UP TNL information, e.g., a cell group ID, a transport layer address and/or a GTP-TEID.

In step 705 as shown in FIG. 7, MN 720 generates and sends a RRC message to UE 710, and the RRC message includes SDAP/PDCP configurations from SN 730 and RLC/MAC configurations from SN 740.

In step 706 as shown in FIG. 7, MN 720 informs SN 730 about "SN 740 DL UP TNL information" using a SN modification request message.

Figure 9:
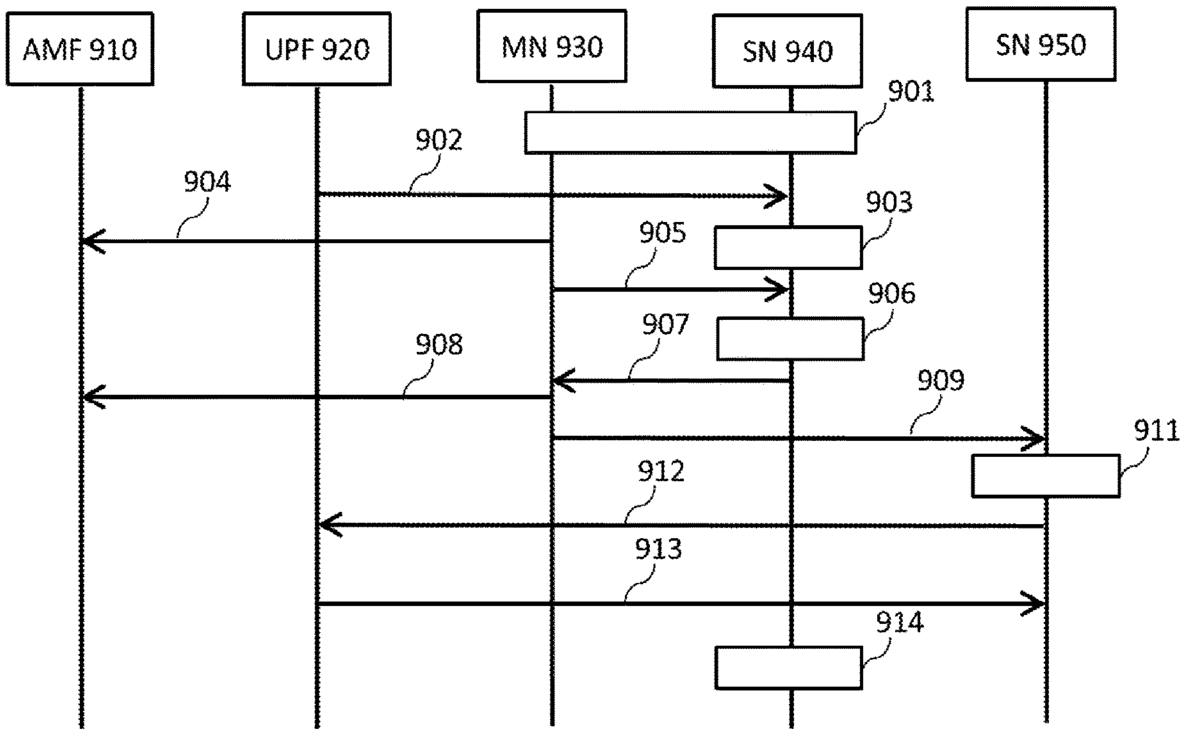
FIG. 9 illustrates an exemplary flowchart of supporting a fast SN switch procedure triggered by a SN in accordance with some embodiments of the present application.

The embodiments of FIGS. 8 and 9 refer to a fast switch procedure between SNs for the same QoS flow(s). In the embodiments of FIGS. 8 and 9, the same QoS flow is anchored at different SNs (e.g., SN 840 and SN 850), and either a MN (e.g., MN 830) or the current serving SN (e.g., SN 840) can decide to switch a UE from one SN to another SN. The embodiments of FIGS. 8 and 9 assume that a UE is provided with SCG configurations from different SNs in advance of a SN switch procedure, and the switch procedure between SNs will not impact the MCG configuration.

FIG. 8 illustrates an exemplary flowchart of supporting a fast SN switch procedure triggered by a MN in accordance with some embodiments of the present application.

In step 801 as shown in FIG. 8, MN 830, SN 840 and SN 850 perform a multiple SN addition and preparation procedure. In step 802, UPF 820 transmits DL data transmission(s) to SN 840. In block 803, SN 840 functions as a serving SN.

In step 804 as shown in FIG. 8, when MN 830 decides to prepare multiple SNs for the same UE and wants to support a fast switch procedure between different SNs, MN 830 lets AMF 810 be aware of the prepared SNs and the serving SN by sending any (or a combination) of following to AMF 810 using, e.g., a PDU session resource modify indication message:

(1) Multiple pieces of DL TNL information. Each piece of the DL TNL information represents a DL address for each SN.

(2) Associated QoS flow(s) for each SN DL TNL, e.g., an ID of the QoS flow, a QoS requirement; and QoS parameter(s).

(3) Indication(s) for (each) SN DL TNL which indicates whether this SN is a serving SN. Such indication(s) may be used to indicate whether UPF 820 should transfer DL data to this DL TNL address.

(4) DL TNL information for the serving SN.

In some embodiments, when MN 830 decides to switch a UE from one SN to another SN, MN 830 may inform AMF 810 about the SN switch procedure by sending another PDU session resource modify indication message to AMF 810 including, e.g., the DL TNL information for the serving SN.

In step 805 as shown in FIG. 8, when MN 830 decides to switch the UE from one SN to another SN, MN 830 may inform UPF 820 about the SN switch procedure by adding relevant information in a GTP-U header sent to UPF 820.

(1) In one example, a new field is added to the GTP-U header indicating whether SN 840 will stop being a serving SN.

(2) In a further example, a new field is added to the GTP-U header indicating whether SN 840 will start being a serving SN.

(3) In another example, a new field is added to the GTP-U header indicating the address information (e.g., tunnel endpoint ID) of the new serving SN (e.g., SN 850).

In step 806 as shown in FIG. 8, MN 830 transmits a SN modification request message including a non-serving SN indicator to SN 840. In block 807, SN 840 functions as a non-serving SN. In block 808, SN 850 functions as a non-serving SN. In step 809, UPF 820 transmits DL data transmission(s) to SN 850. Then, in block 811, SN 850 functions as a serving SN.

FIG. 9 illustrates an exemplary flowchart of supporting a fast SN switch procedure triggered by a SN in accordance with some embodiments of the present application.

Steps 901, 902, and 904 and block 903 in the embodiments of FIG. 9 are the same as steps 801, 802, and 804 and block 803 in the embodiments of FIG. 8, respectively.

In step 905 as shown in FIG. 9, MN 930 lets the current serving SN, i.e., SN 940, be aware of the existence of those non-serving SNs/SCGs using a Xn message, e.g., a SN modification request. In this way, the current serving SN, i.e., SN 940, can decide based on the received measurement result to switch a UE to a new serving SN.

In block 906 as shown in FIG. 9, the UE is switched from SN 940 to SN 950. In step 907, SN 940 transmits, to MN 930, a SN modification required message including SN 950 related information. The same as step 904, in step 908, MN 930 lets AMF 910 be aware of the prepared SNs and the serving SN by sending any (or a combination) of following to AMF 910 using, e.g., a PDU session resource modify indication message:

(1) Multiple pieces of DL TNL information. Each piece of the DL TNL information represents a DL address for each SN.

(2) Associated QoS flow(s) for each SN DL TNL, e.g., an ID of the QoS flow, a Qos requirement; and QoS parameter(s).

(3) Indication(s) for (each) SN DL TNL which indicates whether this SN is a serving SN. Such indication(s) may be used to indicate whether UPF 920 should transfer DL data to this DL TNL address.

(4) DL TNL information for the serving SN.

Similar to step 905 as shown in FIG. 9, in step 909, MN 930 lets SN 950, be aware of the existence of those non-serving SNs/SCGs using a Xn message, e.g., a SN modification request. In this way, the current serving SN, i.e., SN 950, can decide based on the received measurement result to switch a UE to a new serving SN. In block 911, SN 950 functions as a serving SN.

In step 912 as shown in FIG. 9, when SN 950 decides to switch the UE from SN 950 to another SN, SN 950 may inform UPF 920 about the SN switch procedure by adding relevant information in a GTP-U header sent to UPF 920. In one example, a new field is added to the GTP-U header indicating whether SN 950 will stop being a serving SN. In a further example, a new field is added to the GTP-U header indicating whether SN 950 will start being a serving SN. In another example, a new field is added to the GTP-U header indicating the address information (e.g., tunnel endpoint ID) of the new serving SN (e.g., SN 940).

In some embodiments, when the current serving SN (e.g., SN 950) decides to switch the UE from SN 950 to another SN, SN 950 has to inform MN 930 about the decision over Xn interface first. Then, MN 930 may inform AMF 910 about the existence of those non-serving SNs/SCGs using a Xn message, e.g., a SN modification request.

In step 913 as shown in FIG. 9, UPF 920 transmits DL data transmission(s) to SN 950. In block 914, after the serving SN (e.g., SN 940) becomes a non-serving SN, SN 940 will release context related to other serving or non-serving SNs/SCGs.

Figure 10:
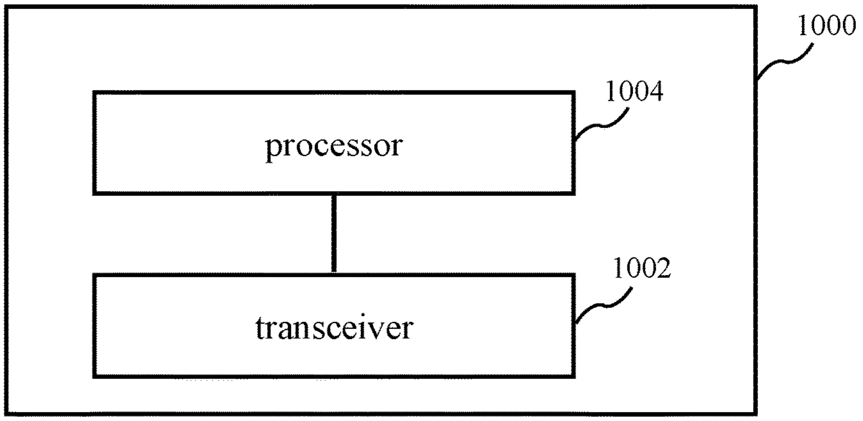
FIG. 10 illustrates an exemplary block diagram of an apparatus according to some embodiments of the present application.

FIG. 10 illustrates an exemplary block diagram of an apparatus according to some embodiments of the present application. As shown in FIG. 10, the apparatus 1000 may include at least one processor 1004 and at least one transceiver 1002 coupled to the processor 1004. The apparatus 1000 may be a network device (e.g., a MN or a SN) in a MR-DC scenario.

Although in this figure, elements such as the at least one transceiver 1002 and processor 1004 are described in the singular, the plural is contemplated unless a limitation to the singular is explicitly stated. In some embodiments of the present application, the transceiver 1002 may be divided into two devices, such as a receiving circuitry and a transmitting circuitry. In some embodiments of the present application, the apparatus 1000 may further include an input device, a memory, and/or other components.

In some embodiments of the present application, the apparatus 1000 may be a MN in a MR-DC scenario. The processor 1004 in the MN may be configured: to determine whether to support a QoS flow terminated at one SN or whether to support a further QoS flow terminated at multiple SNs simultaneously; and to determine that the QoS flow is terminated at a SN and the QoS flow uses a radio resource of a SCG at a further SN, in response to supporting the QoS flow. The transceiver 1002 in the MN may be configured to transmit, via the wireless transceiver to a CN node, information regarding a current serving SN of the further QoS flow, in response to supporting the further QoS flow.

In some embodiments of the present application, the apparatus 1000 may be a SN in a MR-DC scenario. The processor 1004 in the SN may be configured to determine whether to support a quality of service (QoS) flow terminated at one SN. The transceiver 1002 in the SN may be configured: to transmit, via the wireless transceiver, data forwarding address information of the SN and configuration information of the SN, in response to supporting the QoS flow; and to receive, via the wireless transceiver, data forwarding address information of a further SN and configuration information related to a radio resource of a SCG at the further SN, in response to supporting the QoS flow.

In some embodiments of the present application, the apparatus 1000 may be a SN in a MR-DC scenario. The transceiver 1002 in the SN may be configured to receive, via the wireless transceiver from a MN, configuration information for supporting a QoS flow. The processor 1004 in the SN may be configured to determine whether the SN is a current serving SN of the QoS flow and to determine whether to switch a UE from the SN to a further SN in response to the SN being the current serving SN, wherein the further SN is a next serving SN after switching the UE.

In some embodiments of the present application, the apparatus 1000 may further include at least one non-transitory computer-readable medium. In some embodiments of the present disclosure, the non-transitory computer-readable medium may have stored thereon computer-executable instructions to cause a processor to implement the method with respect to a network device (e.g., a MN or a SN) in a MR-DC scenario as described above. For example, the computer-executable instructions, when executed, cause the processor 1004 interacting with transceiver 1002, so as to perform operations of the methods, e.g., as described in view of any of FIGS. 4-9.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including.

What is claimed is:

1. A network apparatus for wireless communication, comprising:

at least one memory; and at least one processor coupled with the at least one memory and operable to cause the network apparatus to:

determine to support a quality of service (QoS) flow terminated at multiple secondary nodes (SNs) simultaneously, wherein a first SN of the multiple SNs is a current serving SN and at least a second SN of the multiple SNs is a non-serving SN; and transmit, to a core network (CN) node and based at least in part on supporting the QoS flow, information that indicates the current serving SN of the multiple SNs.

2. The network apparatus of claim 1, wherein the at least one processor is further operable to cause the network apparatus to:

determine to support an additional QoS flow terminated at a single SN;

determine, in response to supporting the additional QoS flow, that the additional QoS flow is terminated at a third SN and the additional QoS flow uses a radio resource of a secondary cell group (SCG) at a fourth SN; and transmit, in response to supporting the additional QoS flow, a request to the fourth SN, wherein the request comprises at least one of:

additional information related to the additional QoS flow;

a packet data convergence protocol (PDCP) parameter related to the additional QoS flow;

a radio link control (RLC) parameter related to the additional QoS flow; or uplink (UL) user plane (UP) transport network layer (TNL) information of the third SN.

3. The network apparatus of claim 2, wherein the UL UP TNL information comprises at least one of:

a cell group identifier (ID) of the third SN;

a transport layer address of the third SN; or a general packet radio service (GPRS) tunnelling protocol tunnel endpoint identifier (GTP-TEID) of the third SN.

4. The network apparatus of claim 1, wherein the at least one processor is further operable to cause the network apparatus to:

determine to support an additional QoS flow terminated at a single SN;

determine, in response to supporting the additional QoS flow, that the additional QoS flow is terminated at a third SN and the additional QoS flow uses a radio resource of a secondary cell group (SCG) at a fourth SN; and receive, based at least in part on supporting the additional QoS flow, a response from the fourth SN, wherein the response comprises at least one of:

radio resource control (RRC) configuration information generated by the fourth SN; or downlink (DL) user plane (UP) transport network layer (TNL) information of the fourth SN.

5. The network apparatus of claim 4, wherein the DL UP TNL information comprises at least one of:

a cell group identifier (ID) of the fourth SN;

a transport layer address of the fourth SN; and a general packet radio service (GPRS) tunnelling protocol tunnel endpoint identifier (GTP-TEID) of the fourth SN.

6. The network apparatus of claim 1, wherein a packet data unit (PDU) session resource modify indication message comprises the information regarding the current serving SN of the QoS flow.

7. The network apparatus of claim 1, wherein the information that indicates the current serving SN comprises at least one of:

downlink (DL) address information of one or more SNs of the multiple SNs;

additional information that indicates respective QoS flows associated with the one or more SNs; or an indication of the current serving SN.

8. The network apparatus of claim 1, wherein the at least one processor is further operable to cause the network apparatus to:

determine, in response to supporting the QoS flow, to switch a user equipment (UE) from the current serving SN to a third SN within the multiple SNs, wherein the third SN is a next serving SN after switching the UE.

9. The network apparatus of claim 8, wherein the at least one processor is further operable to cause the network apparatus to:

transmit, to the CN node and in response to determining to switch the UE from the current serving SN to the third SN, additional information regarding the third SN.

10. The network apparatus of claim 1, wherein the at least one processor is further operable to cause the network apparatus to:

transmit, to the current serving SN and in response to supporting the QoS flow, additional information that indicates the non-serving SN.

11. A method performed by a network apparatus, the method comprising:

determining to support a quality of service (QoS) flow terminated at multiple secondary nodes (SNs) simultaneously, wherein a first SN of the multiple SNs is a current serving SN and at least a second SN of the multiple SNs is a non-serving SN; and transmitting, to a core network (CN) node and based at least in part on supporting the QoS flow, information that indicates the current serving SN of the multiple SNs.

12. The method of claim 11, further comprising:

determining to support an additional QoS flow terminated at a single SN;

determining, in response to supporting the additional QoS flow, that the additional QoS flow is terminated at a third SN and the additional QoS flow uses a radio resource of a secondary cell group (SCG) at a fourth SN; and transmitting, in response to supporting the additional QoS flow, a request to the fourth SN, wherein the request comprises at least one of:

additional information related to the additional QoS flow;

a packet data convergence protocol (PDCP) parameter related to the additional QoS flow;

a radio link control (RLC) parameter related to the additional QoS flow; or uplink (UL) user plane (UP) transport network layer (TNL) information of the third SN.

13. The method of claim 12, wherein the UL UP TNL information comprises at least one of:

a cell group identifier (ID) of the third SN;

a transport layer address of the third SN; or a general packet radio service (GPRS) tunnelling protocol tunnel endpoint identifier (GTP-TEID) of the third SN.

14. The method of claim 11, further comprising:

determining to support an additional QoS flow terminated at a single SN;

determining, in response to supporting the additional QoS flow, that the additional QoS flow is terminated at a third SN and the additional QoS flow uses a radio resource of a secondary cell group (SCG) at a fourth SN; and receiving, based at least in part on supporting the additional QoS flow, a response from the fourth SN, wherein the response comprises at least one of:

radio resource control (RRC) configuration information generated by the fourth SN; or downlink (DL) user plane (UP) transport network layer (TNL) information of the fourth SN.

15. The method of claim 14, wherein the DL UP TNL information comprises at least one of:

a cell group identifier (ID) of the fourth SN;

a transport layer address of the fourth SN; and a general packet radio service (GPRS) tunnelling protocol tunnel endpoint identifier (GTP-TEID) of the fourth SN.

16. The method of claim 11, wherein a packet data unit (PDU) session resource modify indication message comprises the information regarding the current serving SN of the QoS flow.

17. The method of claim 11, wherein the information that indicates the current serving SN comprises at least one of:

downlink (DL) address information of one or more SNs of the multiple SNS;

additional information that indicates respective QoS flows associated with the one or more SNs; or an indication of the current serving SN.

18. The method of claim 11, further comprising:

determining, in response to supporting the QoS flow, to switch a user equipment (UE) from the current serving SN to a third SN within the multiple SNs, wherein the third SN is a next serving SN after switching the UE.

19. A first secondary node (SN) for wireless communication, comprising:

at least one memory; and at least one processor coupled with the at least one memory and operable to cause the first SN to:

determine to support a quality of service (QoS) flow terminated at multiple SNs simultaneously, wherein the first SN is a current serving SN of a user equipment (UE), and wherein the multiple SNs comprise the first SN and at least one second SN that is a non-serving SN;

transmit, in response to supporting the QoS flow, first data forwarding address information of the first SN and first configuration information of the first SN; and receive, in response to supporting the QoS flow, second data forwarding address information of the at least one second SN and second configuration information related to a radio resource of a secondary cell group (SCG) at the at least one second SN.

20. A first secondary node (SN) for wireless communication, comprising:

at least one memory; and at least one processor coupled with the at least one memory and operable to cause the first SN to:

receive, from a master node (MN), configuration information for supporting a quality of service (QoS) flow terminated at multiple SNs simultaneously;

determine that the first SN is a current serving SN of the QoS flow, wherein the multiple SNs comprise the first SN and at least a second SN that is a non-serving SN; and determine, in response to the first SN being the current serving SN, whether to switch a user equipment (UE) from the first SN to the second SN, wherein the second SN is a next serving SN after switching the UE.

* * * * *